US 7,047,112 B2

(12) United States Patent
Riedel et al.

(10) Patent No.: US 7,047,112 B2
(45) Date of Patent: May 16, 2006

(54) CONTROL DEVICE FOR A CABIN SYSTEM IN AN AIRPLANE

(75) Inventors: Christian Riedel, Bliedersdorf (DE); Thorsten Reinhold, Buxtehude (DE); Manfred Endress, Buxtehude (DE)

(73) Assignee: KID-Systeme GmbH, Buxtehude (DE)

( * ) Notice: Subject to any disclaimer, the term of this patent is extended or adjusted under 35 U.S.C. 154(b) by 0 days.

(21) Appl. No.: 10/495,316

(22) PCT Filed: Nov. 11, 2002

(86) PCT No.: PCT/DE02/04174

§ 371 (c)(1),
(2), (4) Date: May 11, 2004

(87) PCT Pub. No.: WO03/042797

PCT Pub. Date: May 22, 2003

(65) Prior Publication Data

US 2005/0004725 A1    Jan. 6, 2005

(30) Foreign Application Priority Data

Nov. 13, 2001   (DE) .............................. 101 55 651

(51) Int. Cl.
*G01C 23/00* (2006.01)
(52) U.S. Cl. .................. 701/3; 701/36; 244/75.1
(58) Field of Classification Search ............ 701/1, 701/3, 24, 36; 244/1 R, 75 R, 22; 345/1.1–10, 345/205
See application file for complete search history.

(56) References Cited

U.S. PATENT DOCUMENTS

| 5,475,594 | A | | 12/1995 | Oder et al. | |
|---|---|---|---|---|---|
| 5,854,591 | A | | 12/1998 | Atkinson | |
| 5,971,318 | A | * | 10/1999 | Lustre | 244/1 R |
| 5,995,290 | A | * | 11/1999 | Noble | 359/630 |
| 6,009,355 | A | * | 12/1999 | Obradovich et al. | 701/1 |
| 6,122,575 | A | * | 9/2000 | Schmidt et al. | 701/29 |
| 6,128,553 | A | * | 10/2000 | Gordon et al. | 701/3 |
| 6,131,065 | A | | 10/2000 | Marszalek | |
| 6,187,987 | B1 | * | 2/2001 | Chin et al. | 585/819 |
| 6,401,013 | B1 | | 6/2002 | McElreath | |
| 2002/0015063 | A1 | | 2/2002 | Kopitzke et al. | |

FOREIGN PATENT DOCUMENTS

| EP | 0570690 | 11/1993 |
|---|---|---|
| EP | 0580474 | 1/1994 |
| EP | 1160160 | 12/2001 |
| GB | 2346350 | 8/2000 |

* cited by examiner

*Primary Examiner*—Richard M. Camby
(74) *Attorney, Agent, or Firm*—W. F. Fasse; W. G. Fasse

(57) ABSTRACT

An operating apparatus for a cabin system in an aircraft monitors and controls the functions of cabin systems such as information, audio, lighting, door, water and/or wastewater systems. The apparatus includes a main computer processor with an application software adapted to the cabin system, a display screen, an operator interface with a surface-sensitive input device, a controller for the operator interface, a graphics controller, an audio controller, and at least one magnetic coupler for associated interfaces, arranged in a housing. To carry out additional autonomous functions, an additional second computer with a second central processing unit and further electronic assemblies, is integrated into the housing of the operating apparatus with the common display screen and the common surface-sensitive input device so that an operation of the second computer can be carried out via the surface-sensitive input device. The central processing unit of the second computer is autonomously connected to the main computer processor.

14 Claims, 2 Drawing Sheets

CONTROL DEVICE FOR A CABIN SYSTEM IN AN AIRPLANE

FIELD OF THE INVENTION

The invention relates, to an operating apparatus including a computer processor for a cabin system in an aircraft, which serves to monitor and control functions of preferably information, audio, lighting, door, water and/or wastewater systems.

BACKGROUND INFORMATION

An operating apparatus of such type is, for example, generally known under the name "CIDS unit" in aircraft. This unit controls and monitors a plurality of cabin functions with the aid of operating devices with simple keyboards and relatively small LCDs. It also requires an interface, for example for the connection of a laptop, which is needed by an operator onboard of an aircraft for carrying out additional functions independent of the operating apparatus. This can relate, for example, to the carrying out of test programs or other user programs for the cabin system, whereby also other operating systems independent of the operating system of the operating apparatus can be used.

SUMMARY OF THE INVENTION

The underlying object of the invention is now to embody an operating apparatus of the above mentioned type in such a manner so that additional functions independent of the operating apparatus can be carried out at any time.

The object is achieved according to the invention in that an additional personal computer, as a second main computer processor with its central processing unit and further electronic assemblies, is integrated into the operating apparatus with a common display screen and a common surface-sensitive input device in a housing in such a manner so that an operation of the additional personal computer by means of the surface-sensitive input device of the operator interface results, that the central processing unit of the personal computer is autonomously connected to the main computer processor of the operating apparatus, and that additional autonomous functions can be carried out with the aid of the integrated personal computer by an operator without influencing the functions of the operating apparatus.

Inventive embodiments are described in the dependent claims 2 to 6.

An advantage of the invention exists in a weight savings as well as in the power savings, because when carrying out the additional functions, for example the monitor and loudspeaker of the operating apparatus are used, these structural elements can be omitted from the additional personal computer, and thus do not need to be integrated into the operating apparatus. Furthermore, it is advantageous that the utilized personal computer (or its utilized structural elements) does not (or do not) need any further or additional flight technical permitting or certification for its integration into the operating apparatus, even though structural elements and functions of the operating apparatus are used for the additional functions. Since the additional personal computer can be considered as a structural element module, a comparatively small structural embodiment is advantageously made possible, for example with the dimensions of 360×380×67 mm, which correspond to the dimensions of the operating apparatus.

BRIEF DESCRIPTION OF THE DRAWINGS

An example embodiment according to the invention is illustrated in the drawing, wherein it is shown by.

DETAILED DESCRIPTION OF A PREFERRED EXAMPLE EMBODIMENT OF THE INVENTION

Figure 1:
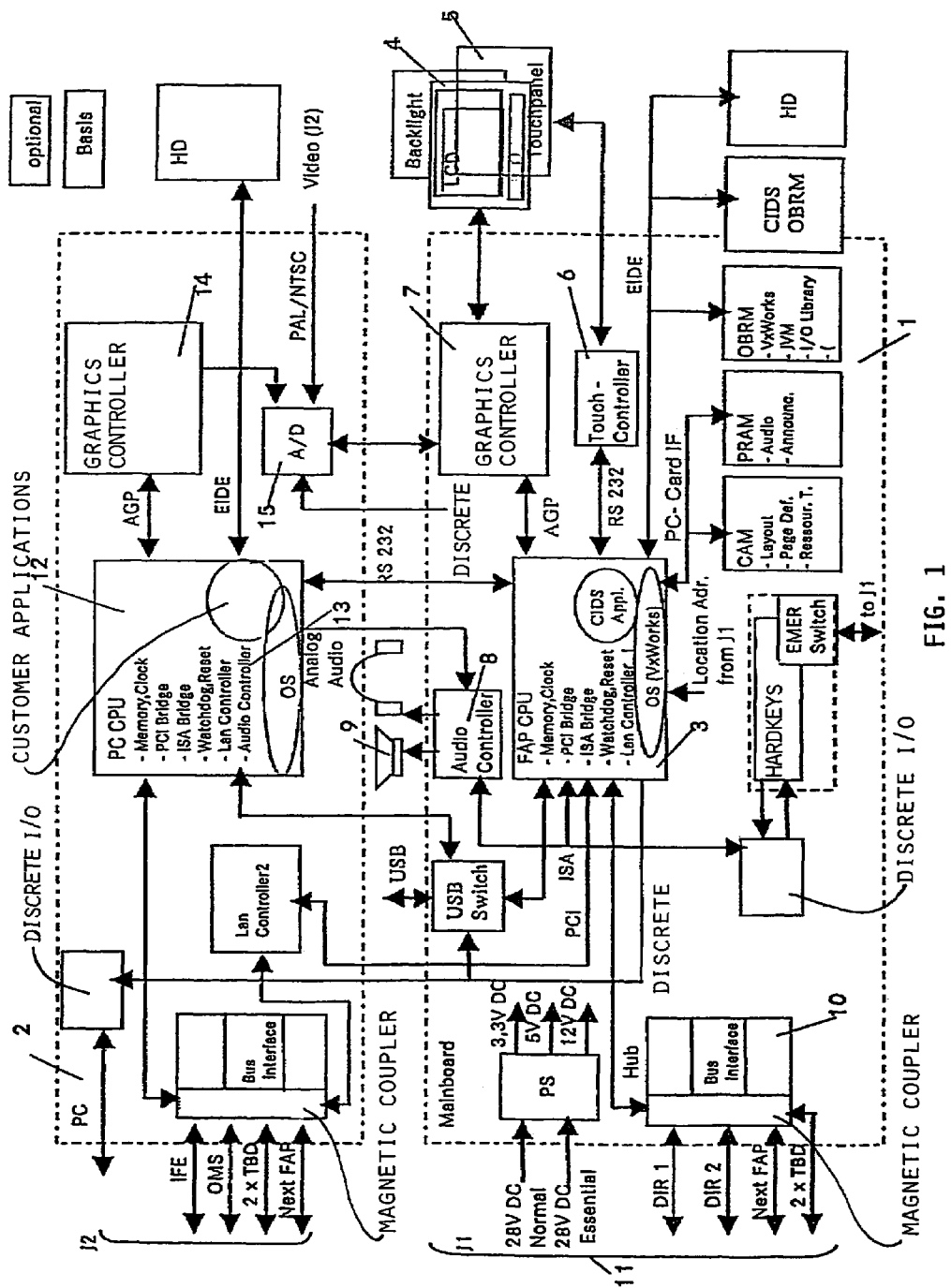
FIG. 1 an operating apparatus for an aircraft cabin system with an integrated personal computer, and FIG. 2 an exploded view illustration of a complete operating apparatus.

In FIG. 1, the operating apparatus 1 comprises, among other things, a main computer processor 3 with a prescribed operating system and with an application software adapted to the cabin system, an operator interface 4 with a surface-sensitive input device 5, a controller 6 for the electrical connection of the operator interface 4 with the main computer processor 3, a graphics controller 7 that is arranged between the operator interface 4 and the main computer processor 3, an audio controller 8 with a loudspeaker 9 arranged downstream therefrom, and at least one magnetic coupler 10 for allocated interfaces 11 connected to the main computer processor 3.

A personal computer referenced with 2 is integrated with all parts of its structural elements into the operating apparatus 1 in such a manner in a housing with a display screen and with a surface-sensitive input device, so that these components can be used by the main computer processor 3 and the additional computer processor 12. The main computer processor 3 conveys the video and audio data of the PC application directly to the display screen and loudspeaker 9. Inputs on the surface-sensitive input device 5 of the operator interface 4 are transferred to the personal computer 2 and are there processed by the aircraft-autonomous applications. In this context, the central processing unit 12 can advantageously comprise an operating system independent from the central computer processor of the operating apparatus 1 and/or a software for airline-specific application functions. In order to be able to carry out additional autonomous functions with the aid of the personal computer 2 by an operator without an influence of the functions of the operating apparatus 1, the audio controller 13 of the personal computer 2 is connected to the audio controller 8 of the operating apparatus 1, and also the graphics controller 14 of the personal computer 2 is connected via an analog/digital converter 15 to the graphics controller 7 of the operating apparatus 1.

Advantageously, a universal serial data transmission bus (USB) is provided for the structural elements of the operating apparatus 1 and of the personal computer 2, whereby an operation of the personal computer 2 can be achieved fundamentally by means of the surface-sensitive input device 5.

Figure 2:
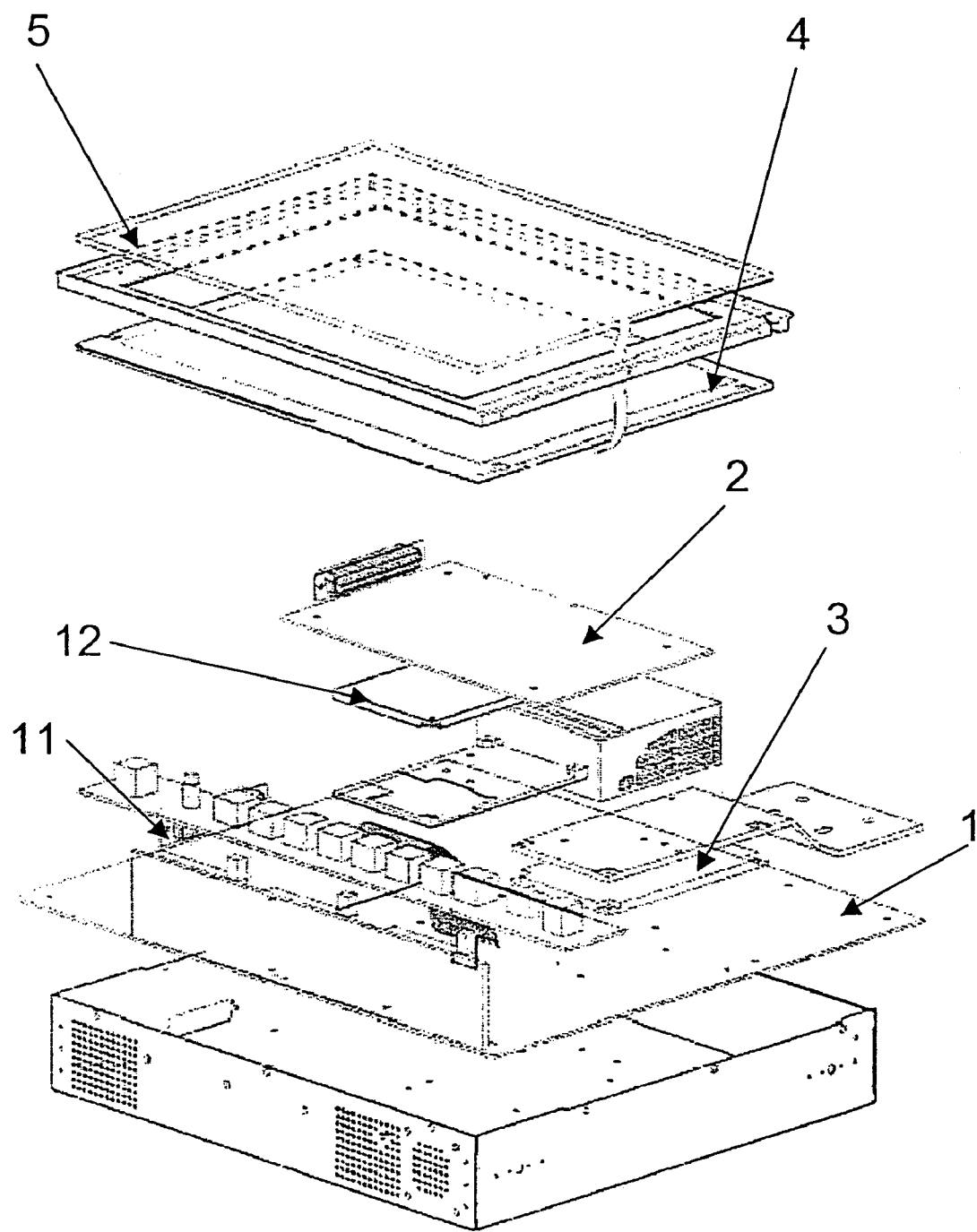

From FIG. 2, the complete operating apparatus is evident, whereby all illustrated structural elements are arranged in a common housing. These are, for example, the personal computer 2, the main computer processor 3, the operator interface 4, the surface-sensitive input device 5, and the central processing unit 12 of the personal computer 2.

The invention claimed is:

1. Operating apparatus for a cabin system in an aircraft, which serves for the monitoring and control of the functions of at least one aircraft cabin system selected from the group consisting of information, audio, lighting, door, water and/or wastewater systems, whereby the operating apparatus comprises, a main computer processor with a prescribed operating system and with an application software adapted to the cabin system, an operator interface with a surface-sensitive input device, a controller for the operator interface, a graphics controller, an audio controller, and at least one magnetic coupler for allocated interfaces, characterized in that an additional personal computer (2), as a second main computer processor with its central processing unit (12) and further electronic assemblies (13, 14, 15), is physically integrated into the operating apparatus (1) with common display screen gand common surface-sensitive input device in a common housing, in such a manner so that an operation of the additional personal computer (2) results by means of the surface-sensitive input device (5) of the operator interface (4), that the central processing unit (12) of the personal computer (2) is autonomously connected to the main computer processor (3) of the operating apparatus (1), and that additional autonomous functions can be carried out with the aid of the integrated personal computer (2) by an operator without influencing the functions of the operating apparatus (1).

2. Operating apparatus according to claim 1, characterized in that the central processing unit (12) comprises an operating system independent of the main computer processor (3) of the operating apparatus (1).

3. Operating apparatus according to claim 1, characterized in that the central processing unit (12) comprises a software for airline-specific application functions.

4. Operating apparatus according to claim 1, characterized in that the audio controller (13) of the personal computer (2) is connected to the audio controller (8) of the operating apparatus (1).

5. Operating apparatus according to claim 1, characterized in that the graphics controller (14) of the personal computer (2) is connected to the graphics controller (7) of the operating apparatus (1).

6. Operating apparatus according to claim 1, characterized by a universal switchable serial data transmission bus (USB) for the structural elements of the operating apparatus (1) and/or of the personal computer (2).

7. An aircraft cabin system operating apparatus comprising:
 a common housing;
 a first computer arrangement that is installed in said common housing and that comprises a first computer processor adapted to execute first functions according to application software which controls and/or monitors one or more cabin systems of an aircraft including at least one cabin system selected from the group consisting of a cabin information system, a cabin audio system, a cabin lighting system, a cabin door status system, a cabin water supply system, and a cabin wastewater system;
 a second computer arrangement that is installed in said common housing and that comprises a second computer processor adapted to execute second functions distinct and independent from said first functions;
 at least one internal interface that interconnects said first computer arrangement and said second computer arrangement for signal exchange therebetween internally in said common housing;
 a common display screen coupled to at least one of said computer arrangements so as to display respective display data selectively from each of said computer arrangements; and
 a common input device coupled to at least one of said computer arrangements so as to provide user input signals selectively to each of said computer arrangements.

8. The aircraft cabin system operating apparatus according to claim 7, further comprising a common loudspeaker coupled to at least one of said computer arrangements so as to provide respective audio signals selectively from each of said computer arrangements to said common loudspeaker.

9. The aircraft cabin system operating apparatus according to claim 7, wherein said second computer arrangement does not have a further display screen allocated and connected thereto.

10. The aircraft cabin system operating apparatus according to claim 7, wherein said common display screen and said common input device are connected directly to said first computer arrangement and not to said second computer arrangement, said display data from said second computer arrangement are provided to said common display screen via said at least one interface and said first computer arrangement, and said user input signals from said common input device for said second computer arrangement are provided to said second computer arrangement via said first computer arrangement and said at least one interface.

11. The aircraft cabin system operating apparatus according to claim 7, wherein said at least one internal interface comprises plural independent internal interface connections between said first computer arrangement and said second computer arrangement entirely internally within said common housing, and said internal interface connections include an input interface connection for said user input signals and an output interface connection for said display data.

12. The aircraft cabin system operating apparatus according to claim 7, wherein said first computer arrangement further comprises a first audio controller and a first graphics controller, said second computer arrangement further comprises a second audio controller and a second graphics controller, said at least one internal interface comprises an audio interface connection between said first and second audio controllers and a graphics interface connection between said first and second graphics controllers, and said audio interface connection and said graphics interface connection are independent and distinct from one another.

13. The aircraft cabin system operating apparatus according to claim 7, wherein said common input device comprises a touch-sensitive input panel superimposed over said common display screen, which is mounted on a major surface plane of said common housing.

14. The aircraft cabin system operating apparatus according to claim 7, wherein said first computer arrangement further comprises a first circuit board on which said first computer processor is mounted, said second computer arrangement further comprises a second circuit board on which said second computer processor is mounted, and said first and second circuit boards are independent and distinct from one another and both mounted internally in said common housing.

* * * * *

UNITED STATES PATENT AND TRADEMARK OFFICE
CERTIFICATE OF CORRECTION

PATENT NO. : 7,047,112 B2  
APPLICATION NO. : 10/495316  
DATED : May 16, 2006  
INVENTOR(S) : Riedel et al.

Page 1 of 1

It is certified that error appears in the above-identified patent and that said Letters Patent is hereby corrected as shown below:

Title page,  
Item [75], Inventors,  
Line 2, replace "Buxtehude" by --Jork--;  
Line 3, replace "Buxtehude" by --Hamburg--.

Column 1,  
Line 6, after "invention", replace "relates," by --relates--.  
Please delete the paragraph at lines 48 to 49.

Column 3.  
Line 11, after "screen", replace "gand" by --and--.

Signed and Sealed this

Fifth Day of December, 2006

JON W. DUDAS  
*Director of the United States Patent and Trademark Office*